United States Patent
Rai et al.

(10) Patent No.: US 7,797,189 B2
(45) Date of Patent: Sep. 14, 2010

(54) SYSTEM AND METHOD OF FORECASTING PRINT JOB RELATED DEMAND

(75) Inventors: Sudhendu Rai, Fairport, NY (US); John C Handley, Fairport, NY (US); Robert H Sperry, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 360 days.

(21) Appl. No.: 11/868,993

(22) Filed: Oct. 9, 2007

(65) Prior Publication Data

US 2009/0094094 A1 Apr. 9, 2009

(51) Int. Cl.
G06Q 10/00 (2006.01)
(52) U.S. Cl. .................................. 705/10; 358/1.15
(58) Field of Classification Search ............... 705/10; 358/1.15
See application file for complete search history.

(56) References Cited

U.S. PATENT DOCUMENTS

| | | | |
|---|---|---|---|
| 7,079,266 B1 | 7/2006 | Rai et al. | |
| 7,148,985 B2 * | 12/2006 | Christodoulou et al. | 358/1.15 |
| 7,242,302 B2 | 7/2007 | Rai et al. | |
| 7,523,048 B1 * | 4/2009 | Dvorak | 705/10 |
| 7,562,062 B2 * | 7/2009 | Ladde et al. | 706/47 |
| 7,584,116 B2 * | 9/2009 | Kakouros et al. | 705/10 |
| 2003/0105661 A1 * | 6/2003 | Matsuzaki et al. | 705/10 |
| 2005/0151993 A1 * | 7/2005 | Gartstein et al. | 358/1.15 |

* cited by examiner

*Primary Examiner*—Thomas Dixon
(74) *Attorney, Agent, or Firm*—Pepper Hamilton LLP

(57) ABSTRACT

A print demand forecasting system is provided for use with a print production system in which print demand data is collected for each print job processed during a selected time interval. The print demand data is processed with a computer implemented service manager to obtain a first demand series with two or more demand components and a second demand series with one demand component. Each one of the two or more demand components is less than a selected variability level and the one demand component is greater than the selected variability level. The computer implemented service manager is adapted to (1) generate a first demand related forecast with a combination of the two or more demand components, and (2) generate a second demand related forecast with the one demand component if convergent forecasting results are obtainable for the second demand series.

22 Claims, 7 Drawing Sheets

SYSTEM AND METHOD OF FORECASTING PRINT JOB RELATED DEMAND

BACKGROUND AND SUMMARY

The disclosed embodiments relate generally to a system and method for improving the operability of a print production environment and, more particularly to an improved approach for forecasting demand in an environment where both low variability and high variability print jobs are processed.

Document production environments, such as print shops, convert printing orders, such as print jobs, into finished printed material. A print shop may process print jobs using resources such as printers, cutters, collators and other similar equipment. Typically, resources in print shops are organized such that when a print job arrives from a customer at a particular print shop, the print job can be processed by performing one or more production functions.

In one example of print shop operation, product variety (e.g., the requirements of a given job) can be low, and the associated steps for a significant number of jobs might consist of printing, inserting, sorting and shipping. In another example, product variety (corresponding, for instance, with job size) can be quite high and the equipment used to process these jobs (e.g. continuous feed machines and inserting equipment) can require a high changeover time. Experience working with some very large print shops has revealed that print demand exhibits a tremendous variety of time series behavior. High variability in such large print shop environments can result from large volumes, and may be manifested in what is sometimes referred to as "fat-tailed" or "heavy-tailed" distributions.

Forecasting demand for a given large print shop can be useful in, among other things, managing shop resources. However, traditional approaches of forecasting (as found in associated literature) may be insufficient to suitably forecast demand in large print shops with considerable print job variability. For instance, in literature relating to forecasting a preference toward using pooled demand forecast (as opposed to forecasting components individually and summing the forecasts to obtain an aggregate forecast) has been expressed. It has been found, however, that pooled demand forecasting can break down in, among other environments, print production environments when the job related demand exhibits relatively high levels of variability.

In one aspect of the disclosed embodiments there is disclosed a print demand forecasting system for use with a print production system in which multiple print jobs are processed over a selected time interval. The print demand forecasting system includes: a data collection tool, said data collection tool collecting print demand data for each print job processed during the selected time interval; mass memory for storing the collected print demand data; and a computer implemented service manager for processing the stored print demand data to obtain a first demand series with two or more demand components and a second demand series with one demand component, each one of the two or more demand components being less than a selected variability level and the one demand component being greater than the selected variability level, said computer implemented service manager being adapted to (1) generate a first demand related forecast with a combination of the two or more demand components, and (2) generate a second demand related forecast with the one demand component if convergent forecasting results are obtainable for the second demand series.

In another aspect of the disclosed embodiments there is disclosed a computer implemented method for use with a print production system where multiple print jobs are processed over a selected time interval. The method includes: (A) collecting print demand data for each print job processed during the selected time interval; (B) storing the collected print demand data in memory; (C) processing the stored print demand data to obtain a first demand series with two or more demand components and a second demand series with one demand component, each one of the two or more demand components being less than a selected variability level and the one demand component being greater than the selected variability level; (D) generating a first demand related forecast with a computer, the first demand related forecast being obtained with a combination of the two or more demand components; (E) generating a second demand related forecast with the computer, the second demand related forecast being obtained with the one demand component; and (F) using at least one of the first and second demand related forecasts to improve operability of the print production system.

DESCRIPTION OF DISCLOSED EMBODIMENTS

Figure 1:
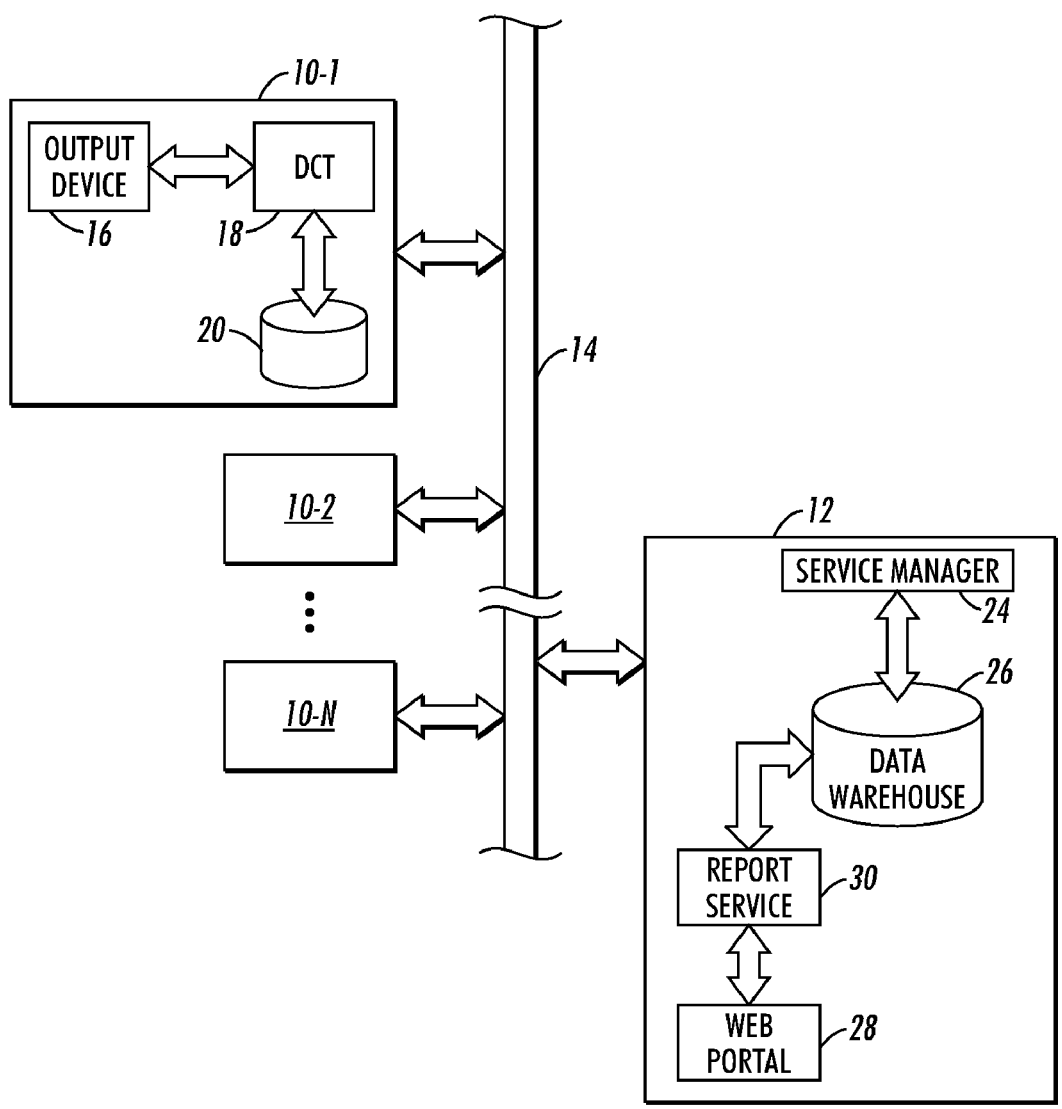
FIG. 1 is a block diagram of a data collection/processing architecture, suitable for use with the disclosed embodiments.

Referring to FIG. 1, a network print production system, with a data processing center, is shown. In the illustrated approach of FIG. 1, a series of document production centers 10-1 through 10-N (collectively referred to as document production centers 10, some of which may include print shops or production print facilities) communicate with the data processing center 12 by way of a network (such as a wide area network (possibly including the world wide web)) 14. At least one of the document production centers (e.g., document production center 10-1) includes an output device 16 communicating with a data collection tool ("DCT") 18. While particular attention is paid below to document production center 10-1, several of the document production centers 10 may include the combination of at least one output device and a DCT. Additionally, as should be apparent to those skilled in the art, the output device 16 may be used in the context of a print shop with a number of other document processing related devices, as illustrated in U.S. Pat. No. 7,079,266 to Rai et al., the pertinent portions of which are incorporated by reference.

In one example, the DCT is a programmable subsystem (possibly assuming the form of a suitable application programmable interface) capable of capturing data, including performance or demand related data, from the output device at selected time intervals. It should be appreciated that, consistent with U.S. Pat. No. 7,242,302 to Rai et al., the pertinent portions of which are incorporated herein by reference, the output device could assume a number of forms, such as a handheld device, PDA, or RFID related device. The DCT 18 may communicate with mass memory 20 for short term storage of, among other things, demand related data. Additionally, a wide variety of performance related information from the output device 16, including information relating to job type, client, duplex/simplex, page counts and impression counts, just to name a few, may be stored in mass memory 20.

The data processing center 12 includes a "service manager" 24 communicating with a "data warehouse" 26. In one illustrated embodiment, the service manager comprises a processing platform that is capable of performing the types of forecasting calculations described below. As contemplated, a variety of data from the document production centers 10, including demand data from mass memory 20, is stored in the data warehouse. The data warehouse may also store job performance related data in the form of a database to facilitate a data segmentation approach, as described below. In the illustrated approach of FIG. 1, output of the service manager is placed in a format (e.g., a report including at least one forecast plot) suitable for communication to a network web portal 28 by a report generating application or service 30. The report, in turn, can be used, to the extent necessary, to adjust operation of the document production center to which the report relates. One such adjustment might include ordering inventory based on the report, while another such adjustment might include using the report to control aggregate or capacity planning.

Referring still to FIG. 1, and particularly to the service manager 24, the associated application may use historical print demand to forecast future demand. Based on investigations performed by the present inventors, print demand data (for example, daily page counts or impression counts) for production print shops show unique properties that are not necessarily found in the other domains where forecasting is applied (such as econometrics or product demand). These investigations have shown a substantial amount of variety in time series behavior, including time series with trends, cycles, and some fat-tailed phenomena. Indeed, the time series encountered by the present inventors in the context of production printing do not appear amenable to the sorts of decomposition suggested by the forecasting literature. Inspired by the unique properties of print demand, the present inventors have developed a decomposition strategy that is contrary to the decomposition strategies of the literature. As will appear, the reason the disclosed strategy works is that the statistical models for time series are extended to mixtures, which may not work for many of the data to which time series analysis is applied, but has been found to work very well for print demand data, especially that in production print shops.

Many of the observed time series in the area of production printing appear to demonstrate mixture-like behavior. These mixtures, however, are not necessarily well modeled by a single model, particularly when one component has high volumes and/or high variability. Further, the high variability component may be the result of simply a high but finite variance or could be "fat-tailed" (infinite variance). In the former case, it has been found that forecasting is possible if the high variability component has a strong periodic structure. In the latter case, however, forecasting has been found to be highly problematic and convergence is not achieved even when using the known auto regressive integrated moving average (ARIMA) algorithm with the corresponding model order increased.

Figure 2:
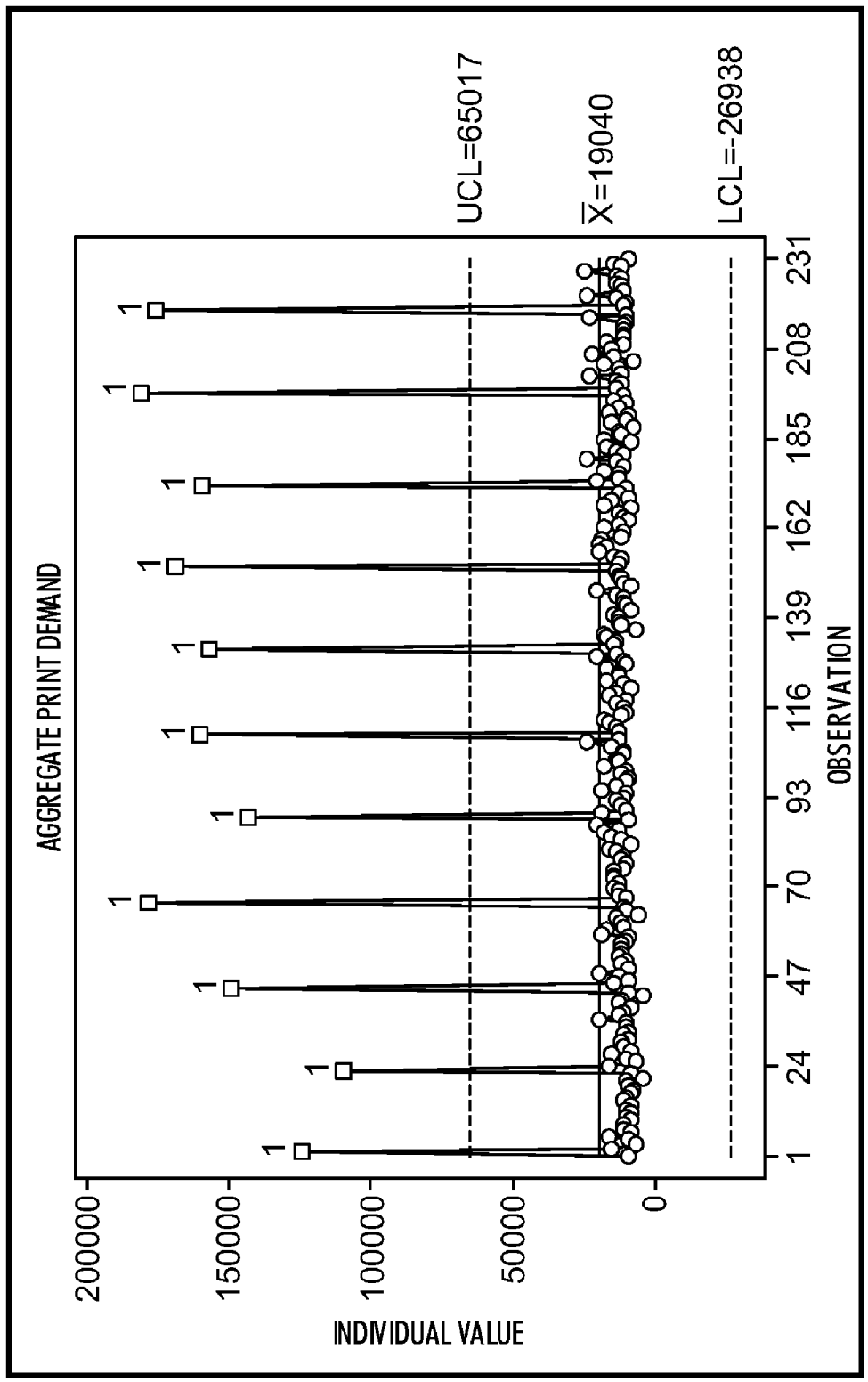
FIG. 2 is a control diagram illustrating the demand experienced by an exemplary production print shop.
Figure 3:
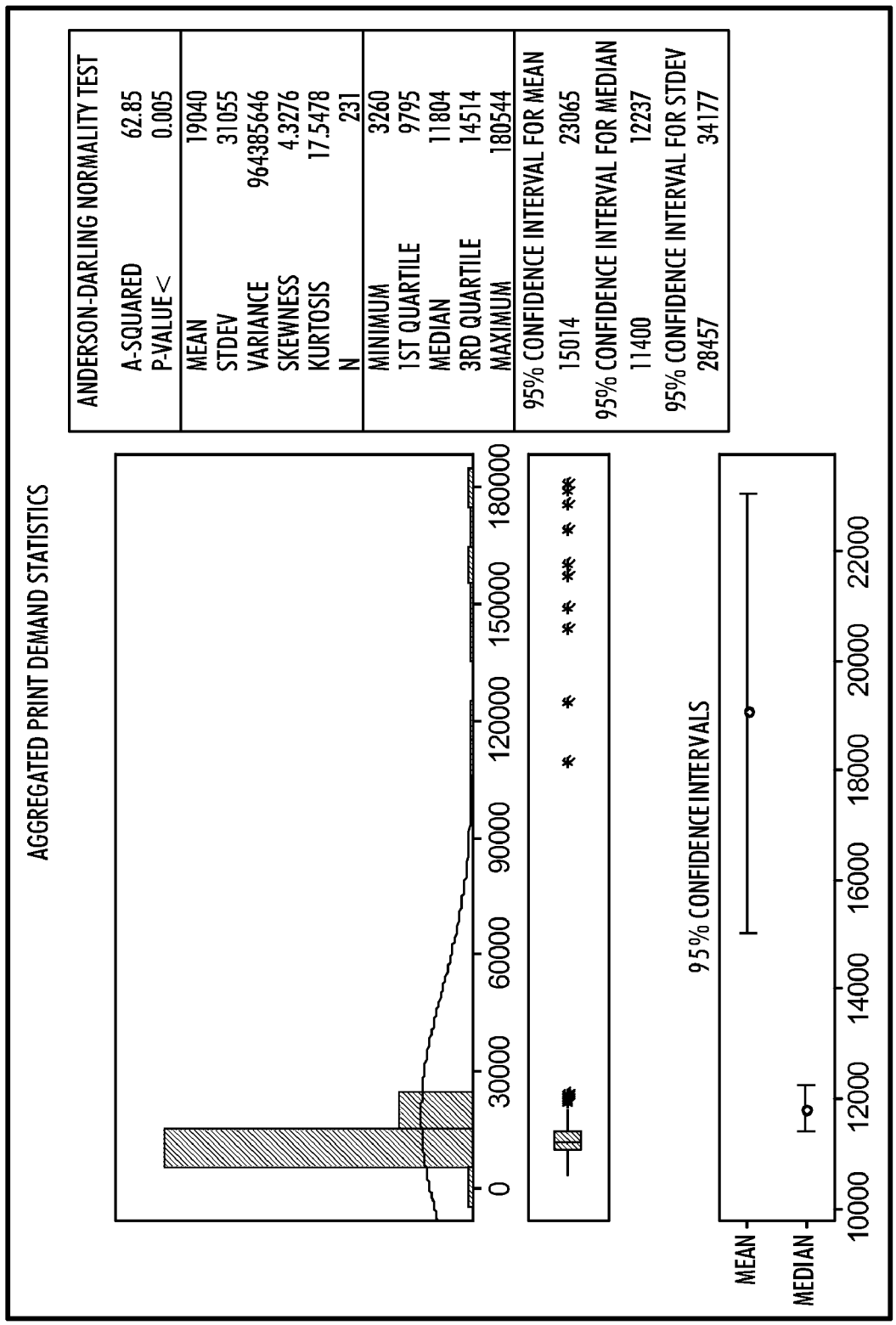
FIG. 3 is a schematic representation of the statistics associated with the demand experienced by the exemplary production print shop.

In the disclosed embodiment, three kinds of decomposition methods are contemplated: 1) A user (print shop performance analyst) plots aggregate time series, notices a mixture behavior, determines which demand corresponds to which job type (indicated by a database field), and segments the time series based on those fields; 2) The user plots the aggregate time series, notices a mixture behavior, and selects the components graphically with a suitable user interface; 3) Mixtures are detected automatically using a model-fitting algorithm (e.g., Expectation-Maximization). Segmentation can be performed with a database attribute (e.g., an attribute, such as job or form type, client, duplex/simplex (i.e., media "plex"), obtained from the data warehouse 26 of FIG. 1), by time slice (e.g., Mondays or firsts of the month), or by statistical thresholding (e.g., demand over and under 30,000 prints). Referring to FIG. 2, the demand experienced by an exemplary production print shop is shown in the form of a control chart. The demand shown in FIG. 2 is an aggregation of demand for three different applications that run on three different form types. The high variability is reflected by the several points that are out of control. Referring to FIG. 3, statistics associated with the demand experienced by the exemplary production print shop is shown.

Figure 4:
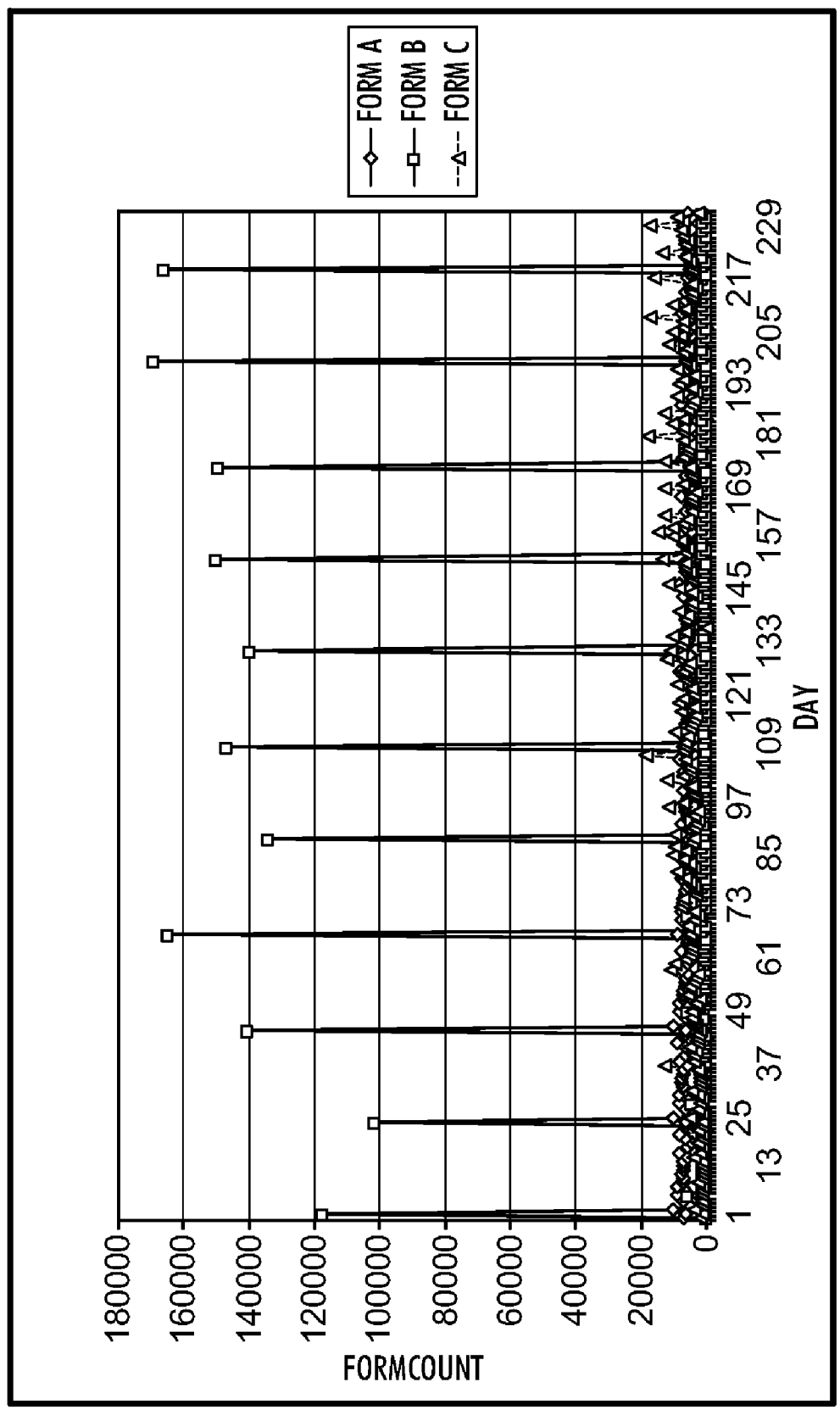
FIG. 4 is a graph illustrating independent demand for three individual applications.

Referring to FIG. 4, the independent demand for the three applications is shown. It can be observed, based on an inspection of FIG. 4, that the demand for Form B experiences significant fluctuations relative to the demand for either Form A or Form C. This observation can confirmed by reference to the following table including selected information about Forms A-C.

TABLE 1

Statistical Characterization of Demand Profiles

|  | Form A | Form B | Form C |
| --- | --- | --- | --- |
| Count | 231 | 231 | 231 |
| Average | 5789 | 7578 | 5673 |
| Standard Deviation (SD) | 1596 | 30770 | 3388 |
| Coefficient of Variation (CV) | 0.28 | 4.06 | 0.60 |
| Total Volume | 1,337,189 | 1,750,512 | 1,310,443 |

In particular, the SD and CV associated with Form B are quite high relative to the SD and CV associated with either Form A or Form C.

Figure 5:
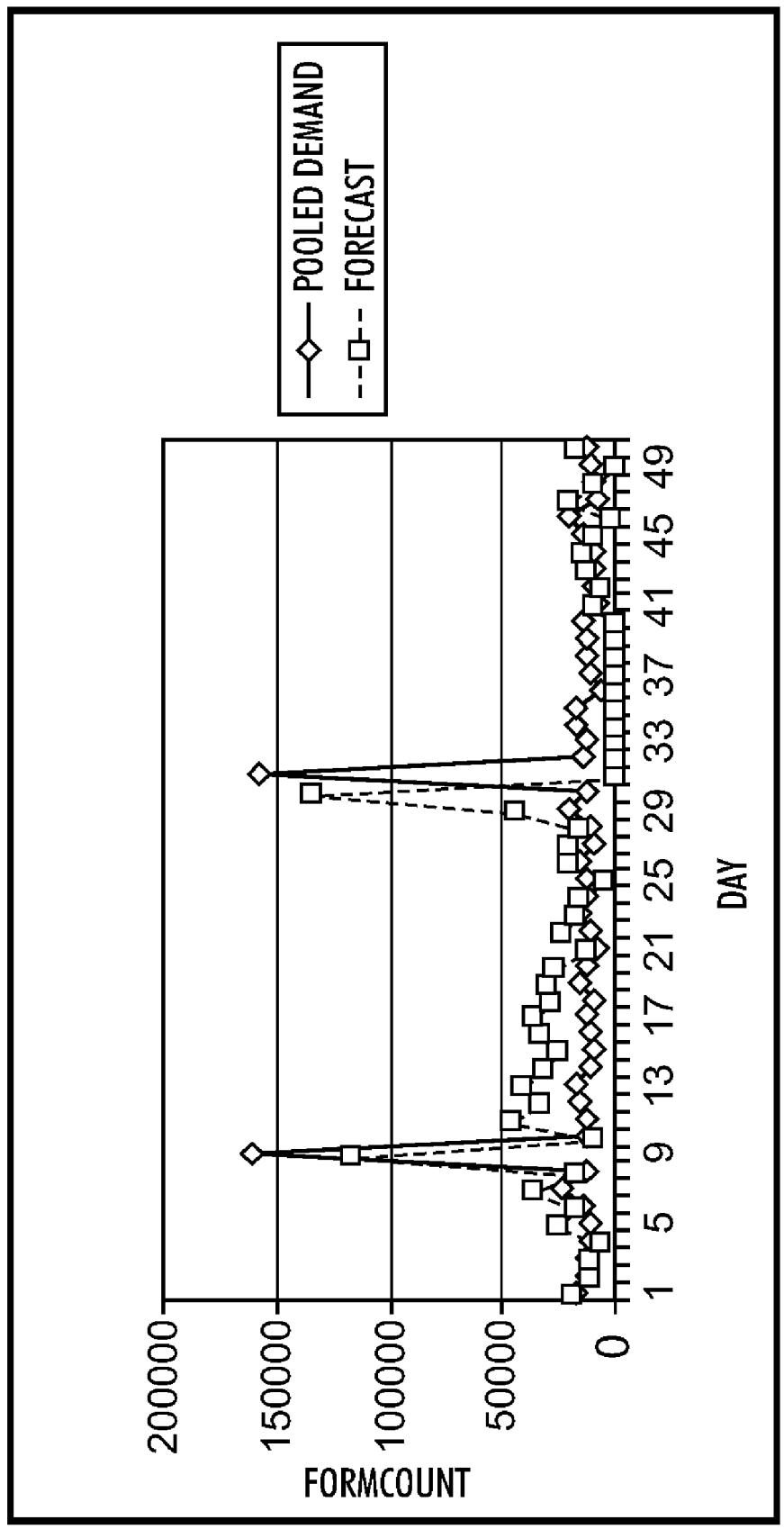
FIG. 5 is a graph illustrating a forecast for 50 days in which actual demand data is plotted against a forecast based on pooled demand from a single model.

Based on an accepted approach of the literature (in which demand from a single model is pooled), a forecast for the aggregated demand of Forms A-C was obtained with the ARIMA algorithm. Referring specifically to FIG. 5, actual demand versus forecasted demand is shown. The illustrated example of FIG. 5 includes a forecast for 50 days where mean absolute deviation (MAD) is 16,432 and mean absolute percentage error (MAPE) is 1.01.

It may be noted that a higher order ARIMA modeling was required to even get the single model to converge. More particularly, pursuant to the forecasting technique, the first 100 points were used to initially generate the single model. 10 days were then forecasted into the future. The next set of forecasts (10 days into the future) came from an ARIMA model built using 110 data points. Subsequently, an ARIMA model using 120 data points was built. Thus FIG. 5 includes five sets of forecasts.

Figure 6:
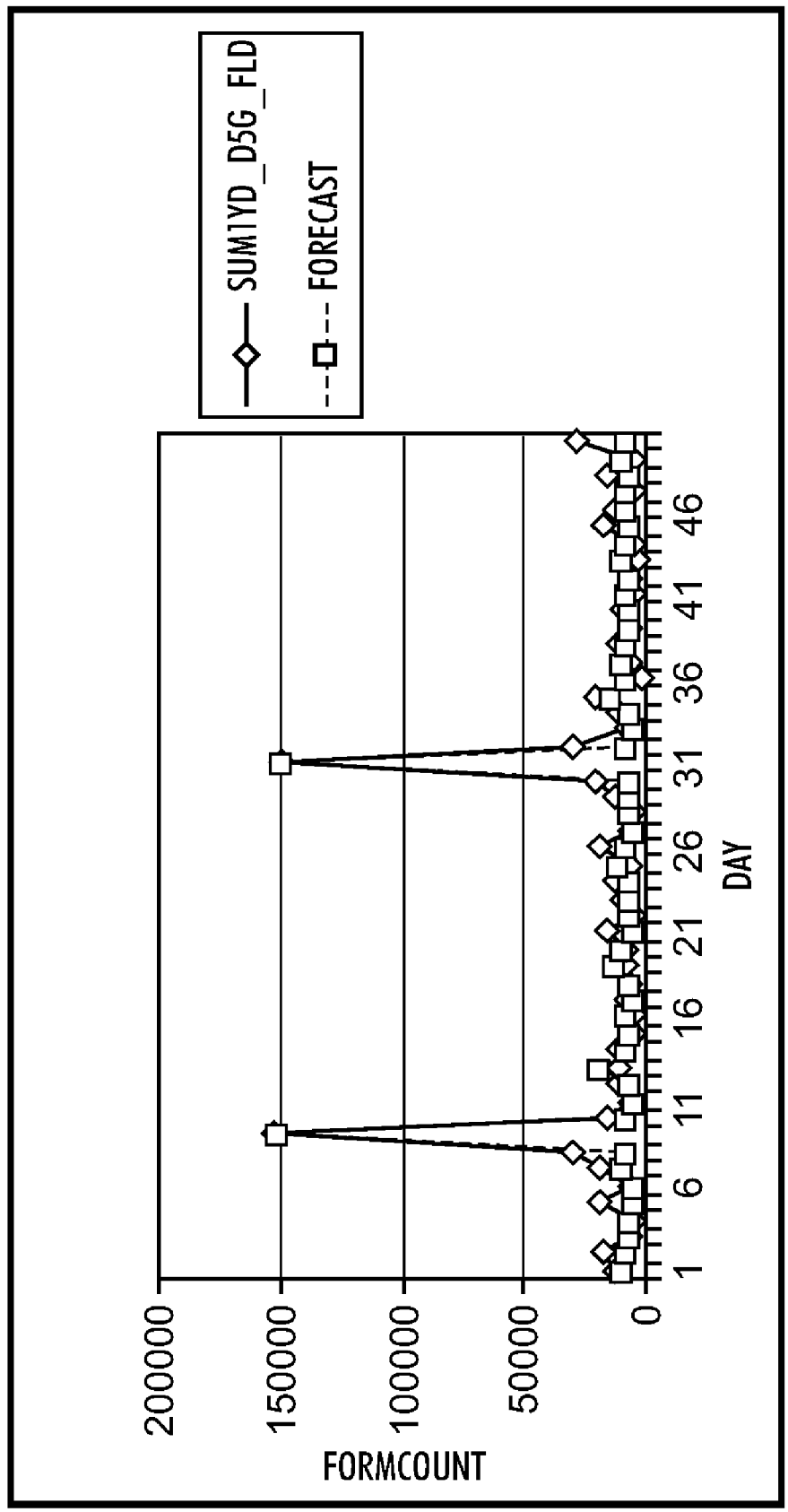
FIG. 6 is a graph illustrating a forecast of the disclosed embodiments in which low variability demand is pooled, high-variability demand is kept separate, and the independent forecasts then summed to obtain an aggregate forecast.

Contrary to the above approach, in which demand is pooled for Forms A-C, two demand series, one corresponding with low variability demand (for Form A and Form C) and the other corresponding with high variability demand (for Form B) were created. The demand for Form A and Form C was pooled and forecasted together, while the demand for Form B was forecasted separately. Referring to FIG. 6, a combination of the two forecasts, where MAD=5482.54 and MAPE=0.59, is shown.

The approach associated with FIG. 6 (where two separate forecasts (Form A and Form C pooled, and Form C separate) are combined) can clearly lead to significantly improved forecasting relative to the approach associated with FIG. 5 (where a single forecast based on pooled demand is employed). The improved forecasting is specifically evidenced by the reduction in MAPE between the two approaches (about 40%).

Figure 7:
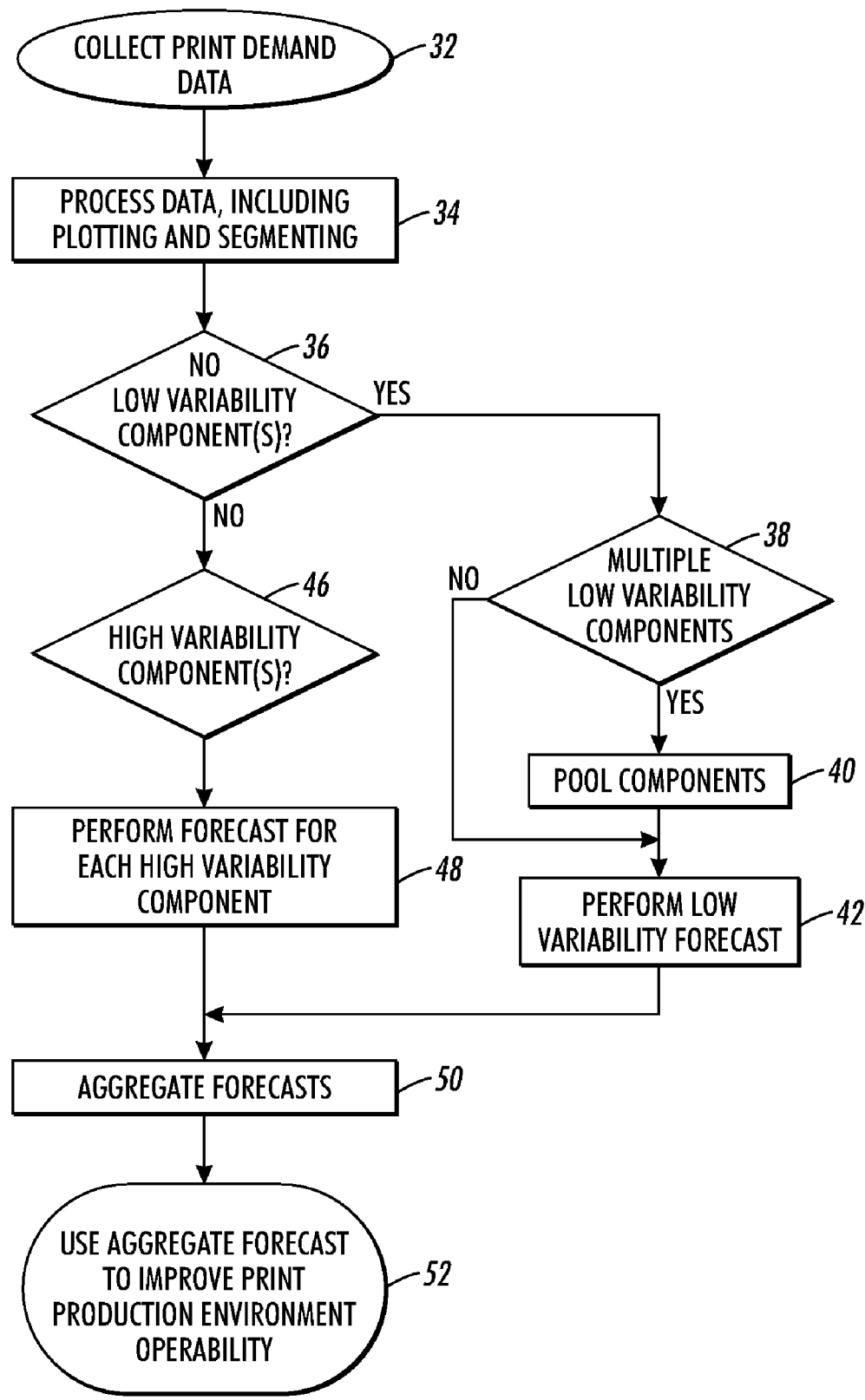
FIG. 7 is a flowchart demonstrating some of the functionality of the disclosed embodiments.

Referring now to FIGS. 1 and 7, a flowchart illustrating an exemplary implementation for the disclosed embodiments, in which forecasting is achieved with two separate forecasts (one with pooling and one without) is shown. Initially, at 32, print demand data is collected for jobs processed at one or more of print production facilities 10. For ease of description, the example of FIG. 7 is described in the context of a single print shop, but as follows from the description above, the disclosed embodiments are as well suited for use in a single print shop as in a networked printing system with multiple print shops.

After a suitable amount of demand related data has been collected, the resulting aggregate print demand data can be plotted with the service manager 24, via 34, and then segmented, as described above. At 36, a check for at least one low variability demand component is performed. Referring still to FIGS. 1 and 7, the number of low variability components may be initially assessed at 38 and, if there are multiple low variability demand components, then a combination or pooling of components is performed with 40. Using one of the forecasting algorithms mentioned above, a forecast may be performed at 42 for one or more low variability demand components.

Referring to 46 (FIG. 7), the number of high variability demand components may be determined, and, at 48, a forecast is, if possible, performed for each high variability component. As contemplated, one of several known techniques may be used in forecasting a given high variability component, provided the forecasting technique used allows for convergent forecasting results. It may be noted that (1) the high variability demand components are not, in accordance with the disclosed embodiments, pooled for forecasting, and (2) it may not be possible, by means of the disclosed embodiments, to accurately forecast each high variability demand component. Regarding (2), it has been found that, without some level of structure in a given demand series (e.g., periodicity), forecasting can be difficult. Moreover, it has been found that convergent forecasting results may simply be unattainable for certain high variability demand series.

Referring conjunctively to FIGS. 6 and 7, after performing forecasting on each high variability demand component, where possible, an aggregation or combination of forecasts can be performed at 50. As indicated at 52, the operability of print production system (which might range from a standalone print shop to multiple networked print shops) may be improved with the forecasting approach of the disclosed embodiments. For instance, the improved forecasting approach can be used to improve resource management or to facilitate capacity planning.

To summarize the above results, it has been observed that pooling of demand may lead to cancellation of variability when the variability of the components is low. If, however, the variability of the components is high, then the high variability component can increase the forecasting error when pooled. This appears to be especially true when the high variability components contain a heavy-tailed (fat-tailed) distribution. Adding a heavy tail distribution to any set of thin-tailed distribution can simply make the overall series heavy-tailed. It has been found that accurate forecasts can be obtained in a print production environment by, among other things, pooling low variability demand, handling high-variability demand separately, and summing resulting independent forecasts to obtain an aggregate forecast. That is, it may be desirable, particularly in a print production environment, to obtain overall forecasts by forecasting the low variability segment and high variability components separately and combining them.

Based on the above description, the following features of the disclosed embodiments should now be apparent:

Print demand data from a print production system is processed to obtain first and second demand series, with the first demand series comprising two or more demand components and the second demand series comprising one demand component. In practice, a first demand related forecast is generated with a combination of the two or more demand components, while a second demand related forecast is generated with the one demand component.

When convergent forecasting results are obtainable for the second demand series, an aggregate plot or display of both the first and second demand related forecasts may be provided.

As contemplated, the one demand component is greater than a selected variability level and a statistical parameter is used to determine that the one demand component is greater than the selected variability level. In one example, the statistical parameter comprises a coefficient of variation. In another example, the demand data may be processed to yield another demand component exceeding the selected variability level. A third demand related forecast may be generated from this other demand component, and the first second and third demand components may be aggregated in a plot or display.

Processing of the print demand data may include plotting the stored print demand data and segmenting the plotted print demand data into the first and second demand series. In one example, the segmenting may be performed with a print processing related attribute. The print processing attribute may include one of: job or form type, client or plex.

The first and second demand related forecasts may be generated respectively with first and second forecasting algorithms. In one example, the first demand related forecast is generated with an auto regressive integrated moving average algorithm, while, in another example, the second demand related forecast is generated with a neural network.

The print production system may either be associated with multiple resources or correspond with capacity. In practice, the at least one of the first and second demand related forecasts may be used to improve either management of resources or capacity planning.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A print demand forecasting system for use with a print production system in which multiple print jobs are processed over a selected time interval, comprising:
    a data collection tool configured to collect print demand data for each print job processed during the selected time interval;
    mass memory for storing the collected print demand data; and
    a processing device configured to implement a service manager, wherein the service manager is configured to:
    determine whether the stored print demand data comprises one or more low variability demand components, wherein each low variability demand component is associated with a demand value that is less than a variability level,
    pool the low variability demand components to generate a pooled low variability demand component,
    generate a first demand forecast associated with the pooled low variability demand component,
    determine whether the stored print demand data comprises one or more high variability demand components, wherein each high variability demand component is associated with a demand value that is greater than the variability level,
    for each high variability demand component, generate a second demand forecast associated with the high variability demand component, and
    generate an aggregate forecast by combining the first demand forecast and the second demand forecasts.

2. The print demand forecasting system of claim 1, wherein at least one of the first and second demand forecasts is used to improve operability of the print production system.

3. The print demand forecasting system of claim 1, wherein the service manager is further configured to provide both the first and second demand forecasts in an aggregate plot or display.

4. The print demand forecasting system of claim 1, wherein the service manager is further configured to use a statistical parameter to determine one or more of the low variability demand components and the high variability demand components.

5. The print demand forecasting system of claim 4, wherein the service manager is further configured to determine whether a coefficient of variation associated with a demand component is greater than the variability level.

6. The print demand forecasting system of claim 1, wherein the service manager is further configured to:
    plot the print demand data, and
    segment the print demand data into a first demand series and a second demand series, wherein the first demand series comprises the one or more low variability demand components, wherein the second demand series comprises the one or more high variability demand components.

7. The print demand forecasting system of claim 6, wherein the service manager is configured to segment the print demand data based on a print processing related attribute.

8. The print demand forecasting system of claim 1, wherein a first forecasting algorithm is used to generate the first demand forecast and a second forecasting algorithm is used to generate each second demand forecast.

9. The print demand forecasting system of claim 8, wherein the first demand forecast is generated with an auto regressive integrated moving average algorithm.

10. The print demand forecasting system of claim 1, in which the print production system is associated with multiple resources, wherein at least one of the first and second demand forecasts is used to manage at least one of the multiple resources.

11. The print demand forecasting system of claim 1, in which the print production system corresponds with capacity, wherein at least one of the first and second demand forecasts is used to improve capacity planning.

12. In a print production system where multiple print jobs are processed over a selected time interval, a computer implemented method comprising:
    collecting print demand data for each print job processed during the selected time interval;
    storing the collected print demand data in memory;
    determining, via a processing device, whether the stored print demand data comprises one or more low variability demand components, wherein each low variability demand component is associated with a demand value that is less than a variability level;
    pooling the low variability demand components to generate a pooled low variability demand component;
    generating, via the processing device, a first demand forecast associated with the pooled low variability demand component;
    determining, via the processing device, whether the stored print demand data comprises one or more high variability demand components, wherein each high variability demand component is associated with a demand value that is greater than the variability level;
    for each high variability demand component, generating, via the processing device, a second demand forecast associated with the high variability demand component; and
    using at least one of the first and second demand forecasts to improve operability of the print production system.

13. The method of claim 12, further comprising:
    providing an aggregate plot or display of both the first demand forecast and the second demand forecast.

14. The method of claim 12, further comprising:
    using a statistical parameter to determine one or more of the low variability demand components and the high variability demand components.

15. The method of claim 14, wherein using a statistical parameter includes determining whether a coefficient of variation associated with at least one of the high variability demand components is greater than the selected variability level.

16. The method of claim 12, wherein includes plotting the stored print demand data and segmenting the plotted print demand data into a first demand series and a second demand series, wherein the first demand series comprises the one or more low variability demand components, wherein the second demand series comprises the one or more high variability demand components.

17. The method of claim 16, wherein said segmenting is performed with a print processing related attribute.

18. The method of claim 17, further comprising selecting the print processing related attribute from one of the following attributes: job or form type, client, or plex.

19. The method of claim 12, further comprising:

using a first forecasting algorithm to generate the first demand forecast and a second forecasting algorithm to generate each second demand forecast.

20. The method of claim 19, wherein using a first forecasting algorithm includes generating the first demand forecast with an auto regressive integrated moving average algorithm.

21. The method of claim 12, in which the print production system is associated with multiple resources, wherein using at least one of the first and second demand forecasts includes using at least one of the first and second demand forecasts to manage at least one of the multiple resources.

22. The method of claim 12, in which at least a part of the print production system corresponds with capacity, wherein using at least one of the first and second demand forecasts includes using at least one of the first and second demand forecasts to improve capacity planning.

* * * * *